(12) United States Patent
Bryant et al.

(10) Patent No.: US 6,642,884 B2
(45) Date of Patent: Nov. 4, 2003

(54) SATELLITE-BASED POSITIONING SYSTEM RECEIVER FOR WEAK SIGNAL OPERATION

(75) Inventors: Roderick C. Bryant, Coder (AU); Eamonn P. Glennon, Torrens (AU); Andrew G. Dempster, London (GB); Stanley L. Dougan, Calwell (AU)

(73) Assignee: SIGTEC Navigation Pty Ltd. (AU)

( * ) Notice: Subject to any disclaimer, the term of this patent is extended or adjusted under 35 U.S.C. 154(b) by 0 days.

(21) Appl. No.: 09/851,355

(22) Filed: May 8, 2001

(65) Prior Publication Data

US 2002/0005802 A1 Jan. 17, 2002

Related U.S. Application Data

(60) Provisional application No. 60/202,464, filed on May 8, 2000, and provisional application No. 60/263,439, filed on Jan. 23, 2001.

(51) Int. Cl.[7] ................................................. G01S 5/14
(52) U.S. Cl. ................................. 342/357.1; 342/357.15
(58) Field of Search ....................... 342/357.09, 357.15, 342/357.1

(56) References Cited

U.S. PATENT DOCUMENTS

| | | | | |
|---|---|---|---|---|
| 6,067,045 A | * | 5/2000 | Castelloe et al. | 342/357.01 |
| 6,075,987 A | * | 6/2000 | Camp et al. | 342/357.12 |
| 6,204,808 B1 | * | 3/2001 | Bloebaum et al. | 342/357.07 |
| 6,222,483 B1 | * | 4/2001 | Twitchell et al. | 342/357.09 |
| 2001/0048387 A1 | * | 12/2001 | Sheynblat | 342/357.09 |

OTHER PUBLICATIONS

Zhao, Yilin, "Assisted–GPS Description to LCS Stage 2 Annex", T1P1.5/99–567r0, Sep. 1999, 6 pages.*

* cited by examiner

*Primary Examiner*—Gregory G. Issing
(74) *Attorney, Agent, or Firm*—Gottlieb Rackman & Reisman (57) ABSTRACT

A method, device and system for determining a receiver location using weak signal satellite transmissions. The invention involves a sequence of exchanges between an aiding source and a receiver that serve to provide aiding information to the receiver so that the receiver's location may be determined in the presence of weak satellite transmissions. With the aiding information, the novel receiver detects, acquires and tracks weak satellite signals and computes position solutions from calculated pseudo ranges despite the inability to extract time synchronization date from the weak satellite signals.

32 Claims, 7 Drawing Sheets

SATELLITE-BASED POSITIONING SYSTEM RECEIVER FOR WEAK SIGNAL OPERATION

This application claims the priority filing date of U.S. Provisional Application Serial Nos. 60/202,464 filed on May 8, 2000, and 60/263,439 filed on Jan. 23, 2001.

FIELD OF THE INVENTION

This invention relates to the design of receivers employed in satellite-based positioning systems (SPS) such as the U.S. Navstar Global Positioning System (GPS), the Russian Global Navigation Satellite System (GLONASS) and the European Galileo system. More specifically, the invention relates to methods, devices and systems for determining a receiver location using weak signal satellite transmissions.

BACKGROUND OF THE INVENTION

Satellite based positioning systems operate by utilizing constellations of satellites which transmit to earth continuous direct sequence spread spectrum signals. Receivers within receiving range of these satellites intercept these signals which carry data (navigation messages) modulated onto a spread spectrum carrier. This data provides the precise time of transmission at certain instants in the signal along with orbital parameters (e.g., precise ephemeris data and less precise almanac data in the case of GPS) for the satellites themselves. By estimating the time of flight of the signal from each of four satellites to the receiver and computing the position of the satellites at the times of transmission corresponding to the estimated times of flight it is possible to determine the precise location of the receiver's antenna.

In a conventional SPS receiver, the process by which this is done involves estimating pseudoranges of at least 4 satellites and then computing from these the precise location and clock error of the receiver. Each pseudorange is computed as the time of flight from one satellite to the receiver multiplied by the speed of light and is thus an estimate of the distance or 'range' between the satellite and the receiver. The time of flight is estimated as the difference between the time of transmission determined from the navigation message and the time of receipt as determined using a clock in the receiver. Since the receiver's clock will inevitably have a different present time when compared to the clock of the satellites, the four range computations will have a common error. The common error is the error in the receiver's clock multiplied by the speed of light.

By using at least 4 satellites it is possible to solve a set of equations to determine both the receiver clock error and the location of the antenna. If only 3 measurements are available it is still possible to determine the location and clock error provided at least one of the receiver's coordinates is already known. Often, this situation can be approximated by estimating the altitude of the antenna.

The signals from the satellites consist of a carrier signal which is biphase modulated by a pseudo-random binary spreading code at a relatively high "chipping" rate (e.g., 1.023 MHz) and then biphase modulated by the binary navigation message at a low data rate (e.g., 50 Hz). The carrier to noise ratio is typically very low (e.g., 31 dBHz to 51 dBHz) at the earth's surface for a receiver with unobstructed line of sight to the satellite from its antenna. However, it is sufficient to permit the signals to be detected, acquired and tracked using conventional phase-locked loop and delay-locked loop techniques and for the data to be extracted.

The process of tracking the code of a signal in a conventional SPS receiver involves the use of a hardware code generator and signal mixer. When the locally generated code is exactly aligned with that of the incoming signal, the output from the mixer contains no code modulation at all. Hence the bandwidth of the signal is much less and it can be filtered to greatly increase the signal to noise ratio. This is usually done using a decimation filter such that the correlator output sampling rate is much lower than the input sampling rate (e.g., 1 kHz at the output compared to 1.3 MHz at the input).

Also, in the case of GPS, the precise time of transmission of this signal corresponding to any given instant at the receiver can be determined by latching the state of the code generator to get the code phase and by counting the code epochs within each bit of the data and by counting the bits within each word of the navigation message and by counting the words within each subframe of the message and by extracting and decoding the times of transmission corresponding to the subframe boundaries. A similar scheme can be used for any SPS.

However, traditional SPS receivers can suffer from troublesome lapses in position identification in the presence of weakened transmission signals. When the direct line of sight between the antenna and the satellites is obstructed, signals may be severely attenuated when they reach the antenna. Conventional techniques can not be used to detect, acquire and track these signals. Moreover, under these circumstances even if the signal could be detected, the carrier-to-noise ratio of a GPS signal, for example, may be as low as or lower than 24 dBHz and as such it is not possible to extract the data from the signals.

Prior art devices have attempted to minimize or overcome these shortcomings through the use of aiding information. In such schemes, additional information is externally supplied to the SPS receivers through various secondary transmission sources to balance the shortfall of information resulting from the attenuated signals. Examples of such devices are taught in the patents to Taylor et al. (U.S. Pat. No. 4,445,118) (aided by satellite almanac data); Lau (U.S. Pat. No. 5,418,538) (aided by differential satellite positioning information and ephemerides); Krasner (U.S. Pat. No. 5,663,734) (aided by transmission of Doppler frequency shifts); Krasner (U.S. Pat. No. 5,781,156) (aided by transmission of Doppler frequency shifts); Krasner (U.S. Pat. No. 5,874,914) (aided by Doppler, initialization and pseudorange data) Krasner (U.S. Pat. No. 5,841,396) (aided by satellite almanac data); Loomis, et al. (U.S. Pat. No. 5,917,444) (aided by selected satellite ephemerides, almanac, ionosphere, time, pseudorange corrections, satellite index and/or code phase attributes); Krasner (U.S. Pat. No. 5,945,944) (aided by timing data); Krasner (U.S. Pat. No. 6,016,119) (aided by retransmission of data from satellite signal)

However, aiding information requires additional transmission capabilities. For example, aiding information may be sent to the SPS receiver using additional satellite transmitters or wireless telephone systems. As such, it is a significant advantage to reduce the quantum of aiding information supplied to limit the use of such additional resources. For example, when the voice path of a wireless communication network is being used to communicate the aiding information, the voice communication will be interrupted by the aiding message. The aiding messages must therefore be as short as possible in order to limit the voice interruptions to tolerable durations and frequencies. Also, no matter how the aiding data is communicated, its communication will delay the operation of the receiver. In many applications the location data is needed promptly and therefore any delay must be minimized.

BRIEF DESCRIPTION OF THE INVENTION

An objective of the present invention is to provide a method and device for use in a satellite positioning system that has improved performance in the presence of obstructed or weak satellite transmission signals while maintaining robust performance in the presence of strong signals.

A further objective is to improve performance of the system utilizing minimal external assistance while maintaining a graceful degradation in performance when this aiding fails.

A still further objective of the invention is to provide a device that achieves a minimal Time To First Fix (TTFF).

Additional objectives will be apparent from the description of the invention as contained herein.

Consistent with these objectives, a device made in accordance with this invention utilizes a novel signal processing scheme for detecting, acquiring and tracking attenuated satellite signals, such as those that might be received at an indoor location, and computes location solutions. The scheme makes novel use of attenuated satellite signals and minimal externally-supplied aiding information.

Under the scheme and in response to a request by the SPS receiver, an aiding source supplies two types of information in an ordered sequence. First, the aiding source provides an approximate location of the receiver preferably to within 20 km and certainly in the GPS case to within 100 km. Second, the aiding source provides precise satellite positions and velocities for the set of tracked satellites. These satellite positions and velocities are computed by the aiding source from ephemeris data for the satellites. No further aiding information is needed.

Generally, the device detects and acquires a set of satellites for tracking based upon information from internally stored almanac data and its approximate location received from the aiding source. Once acquired and in the presence of weak signals, the device relies upon the code phases of the weak satellite signals rather than the transmission time data within the weakened signal. The code phases of the signals are measured at the same instant so that there is a common time of receipt. Then, by determining the differences between the code phases, the resulting values or code phase differences, are taken as ambiguous measurements of the differences in the times of transmission of the satellite signals.

In the preferred embodiment of the invention, these code phase differences are then employed to generate pseudoranges with the assistance of the approximate location received from the aiding source. In the process, the approximate location of the receiver and the precise satellite positions are combined to determine approximate ranges to the satellites. Then, by further combining the approximate ranges with the code phase differences, precise pseudorange differences are derived. Finally, the precise SPS receiver location may be resolved using the precise pseudoranges and the precise satellite positions.

BRIEF DESCRIPTION OF THE DRAWINGS

This invention is illustrated by means of the accompanying drawings. However, these figures represent examples of the invention and do not serve to limit its applicability.

DETAILED DESCRIPTION OF THE INVENTION

There are four distinct elements of the present invention, which are utilized to achieve the aforementioned objectives. The first element is the nature of the aiding information and the manner in which the SPS receiver and the aiding source interact to provide the aiding information. The second relates to a procedure for detecting, acquiring and tracking weak signals while avoiding jamming by strong signals and ensuring graceful degradation under adverse conditions. The third relates to the design of a device for tracking of multiple satellite signals to determine code phases at a common measuring instant. Finally, the fourth element of the invention involves a set of algorithms used to process a weak satellite signal in order to compute a position solution from measured code phase differences. Each of these features will be addressed in turn.

This invention relates to refinements and extensions to a commonly owned invention disclosed in U.S. Pat. No. 5,459,473. Accordingly, the foregoing U.S. patent is hereby incorporated by reference.

A. Aiding Source/Receiver Interaction

As previously described, the aiding data used in accordance with the present invention is limited to information that includes an approximate location for an SPS receiver and the positions and velocities of a specific set of satellites. This information is determined and provided through a request/response sequence. Satellite clock corrections should be included in the aiding data. These are provided in the satellite navigation messages and may be as large as 1 ms. Thus it is essential to apply these corrections in order to accurately compute the pseudorange differences. Instead of supplying satellite positions and velocities, the aiding source can supply corrections for the satellite positions, velocities, accelerations and/or further position derivatives computed from the satellite almanac data. This almanac data may also be used to compute coarse satellite positions, velocities and other derivatives which are corrected using aiding data for use in performing the location solution.

This is advantageous as it allows the satellite positions to be predicted for relatively long periods (eg tens of minutes) with adequate accuracy for computing the receiver location and yet remains undemanding in terms of the amount of aiding data to be transmitted to the receiver.

Because of the compact nature of this data compared to full ephemeris data and its potential longevity, it is feasible to structure the aiding in the form of broadcasts transmitted at regular intervals. The advantage of this is that most of the time it would be unnecessary for the receivers to request aiding and this would significantly reduce system data traffic in the direction toward the network base centre, call centre or wireless web site.

Figure 1:
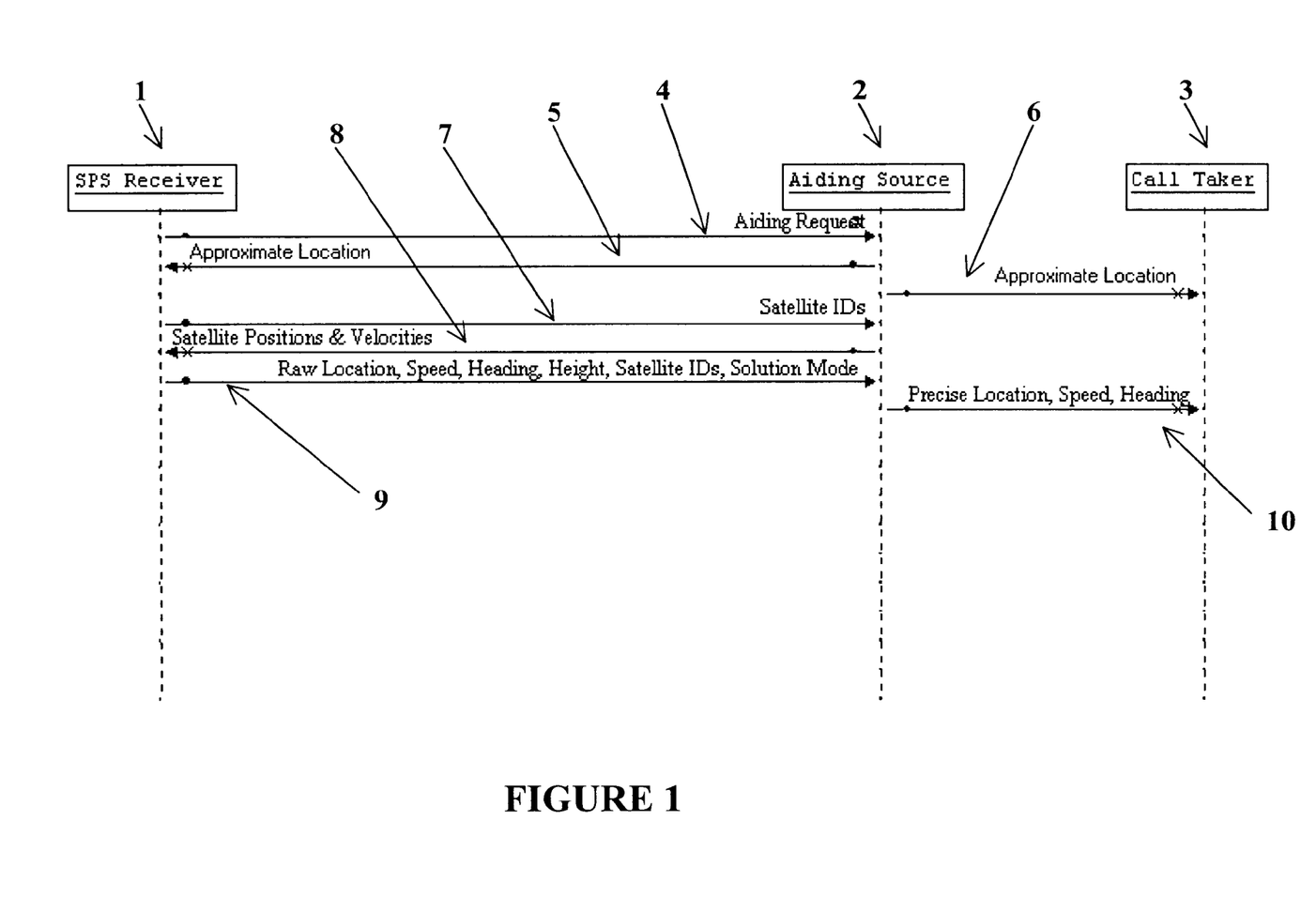
FIG. 1 is a sequence diagram describing the interactions between an aiding source, a call taker and a handset with an integrated SPS receiver according to one embodiment of this invention.

In most cases, however, the system would have to cope with a variety of issues of almanac data in the receivers. This would be handled by:

1. Broadcasting corrections for multiple issues of almanac,
2. Transmitting almanac corrections in response to requests for corrections for a specific issue of almanac, or Broadcasting corrections for the latest one or two issues of almanac and responding to requests for corrections for other issues of almanac. A model of one embodiment of such an exchange in accordance with the present invention is depicted in FIG. 1.

A typical exchange might involve an SPS Receiver 1, an Aiding Source 2 and a Call Taker 3. For instance, the SPS Receiver 1 might be a GPS receiver embedded in or co-located with a wireless telephone or other handset. The Aiding Source 2 may be located at a call center or cell site or elsewhere in the wireless network such that the aiding data is transmitted via a wireless communication link to the handset. The Call Taker 3 may also be located at the call center or other location accessible from the wireless network. The ultimate user of the location data may be either the Call Taker 3 or the user accompanying the SPS Receiver 1. Other forms of transmission between the SPS Receiver 1, Aiding Source 2, and the Call Taker 3 may be utilized without departing from the objectives of the present invention.

To begin the exchange, the SPS Receiver 1 sends a First Aiding Request 4 to the Aiding Source 2. This would typically occur upon activation of the SPS Receiver 1 but may occur at other times as well. In response, the Aiding Source 2, sends a First Aiding Response 5 which contains the approximate location of the SPS Receiver 1. Preferably, the approximate location of the SPS Receiver 1 is accurate to better than one half of a code epoch of a satellite signal multiplied by the speed of light or about 100 km in the case of GPS. The approximate location may also be sent to the Call Taker 3 in a First Aiding Report 6.

With the received approximate location and previously stored almanac data, the SPS Receiver 1 performs its correlation search to acquire satellite signals. The almanac data and the approximate location help to constrain the initial search once at least one satellite has been acquired. Upon acquisition, the SPS Receiver 1 sends a Second Aiding Request 7 to the Aiding Source 2. The Second Aiding Request 7 includes information for identifying the specific set of satellites used by the SPS Receiver 1 in determining pseudorange differences. In response, the Aiding Source 2 determines the precise positions and velocities of the identified set of satellites from ephemeris data for the satellites. The determined positions and velocities are then sent to the SPS Receiver 1 in a Second Aiding Response 8. Since this elapsed time is known and assuming that the latency between transmission and reception of the request for aiding can be determined it is possible for the aiding source to determine the time of reception of the satellite signals to within a few tens of milliseconds.

However, if almanac corrections are to be used by the receiver then the receiver needs to determine the times of transmission (TOTs) with an accuracy of the order of 10 ms. Furthermore, it is preferable for the receiver to do this without requiring the estimation of the latencies as this is cumbersome, inelegant and, potentially error prone.

The aiding data can contain a timetag accurate to, say, 1 ms at the aiding source. Because of the communications latency, this accuracy will be degraded to the order of seconds for some wireless communications media such as short message services. Hence, this approach is not useful unless the latency is estimated. Instead, we can use the following facts to restrict the TOTs to a discrete set of alternatives:

a) The boundaries of the code epochs are transmitted from the satellites at millisecond boundaries in GPS time;
b) The time between each TOT and the preceding code epoch boundary is known as it corresponds to the measured codephase for that satellite;
c) The Time Of Receipt (TOR) of the signals at the receiver is known to an accuracy of much less than 1 s; and
d) The range to each satellite is known to an accuracy of below 1 ms (as required to permit the ambiguity resolution of the pseudorange differences).

The TOR and the TOTs can therefore be estimated as follows:

1. Subtract the average Time-Of-Flight (average TOF approx=70 ms) from the coarse TOR and use the almanac to compute the satellite positions at this approximate TOT.
2. Correct these satellite positions using the almanac corrections.
3. Estimate the satellite ranges to the estimated receiver location and thus the TOFs.
4. Subtract these from the coarse TOR to refine the TOTs.
5. Compute the corresponding satellite positions using the almanac and almanac corrections.
6. Iterate steps 3 to 5 until the solution converges according to some criterion.
7. Compute new TOTs as in steps 3 and 4 above.
8. Correct each TOT to the nearest possible value using a) and b) above together with the corresponding codephase measurement and clock corrections for that satellite.
9. Compute new satellite positions using the almanac and almanac corrections.
10. Compute a new receiver location estimate and a set of pseudorange difference residuals using the estimated range differences and the satellite positions obtained in step 9.
11. Calculate the mean squared value of the pseudorange residuals.
12. Enclose steps 7 to 11 in a Newton-Raphson recursion loop or similar to determine the TOR value giving rise to the smallest mean-squared residual value. This is the final TOR estimate and the difference between it and the original coarse TOR estimate may be used to correct the receiver clock. The corresponding receiver location estimate is the final receiver location estimate.

For subsequent updates of the navigation filter this process may be omitted

Therefore, under this scheme since the Aiding Source 2 provides precise satellite positions and velocities, the Aiding Source 2 rather than the SPS Receiver 1 needs to be able to determine specific time synchronization data from the satellite signals and needs to maintain or acquire ephemeris data. Moreover, in order to ensure that the satellite positions are accurate when received by the SPS Receiver 1 from Aiding Source 2, the latency period for the communication between the two must be within a few tens of milliseconds. This will ensure a limitation on the error in the computed satellite locations to a few meters. To this end, in the preferred embodiment, the Second Aiding Request 7 occurs at a known elapsed time from the instant when the code phases of the satellite signals latch. Since this elapsed time is known and assuming that the latency between transmission and reception of the request for aiding can be determined it is possible for the Aiding Source 2 to determine the time of reception of the satellite signals to within a few tens of milliseconds.

After receiving the satellite positions and velocities and using pseudorange and range rate differences, the SPS Receiver 1 then computes a Position and Velocity (PV) solution to determine its precise location, speed, heading, etc. After such determination, the SPS Receiver 1 then sends a Receiver Report 9 to the Aiding Source 2 which includes the raw location, speed, heading, height, satellite identifications and the solution mode used by it (i.e. 3D or 2D with altitude aiding).

Upon receipt of this later information, the Aiding Source 2 may take further action. For example, the Aiding Source 2 may use the known satellite set and times of transmission, select differential pseudorange corrections (obtained by any available means) and then compute a corresponding location correction consistent with the reported mode of solution. With this later computation, the Aiding Source 2 may then apply the correction to the location reported by the SPS Receiver to obtain a more current location. This precise location then may be sent to the Call Taker 3 in a Second Aiding Report 10.

As an alternative embodiment of this aforementioned exchange, the SPS Receiver 1 reports the code phase differences to the Aiding Source 2. In this event, the Aiding Source 2 could compute a PV solution for the SPS Receiver 1 using a method like that of the SPS Receiver 1.

As described, the scheme requires the SPS Receiver 1 to compute pseudoranges without the benefit of having actual time synchronization data from the satellite signals. The use of this data is avoided because the code phases of the satellite signals are taken as ambiguous measurements of the differences in the times of transmissions of the satellite signals. This is accomplished by measuring the code phases at the same instant so that there is a common time of receipt. Moreover, the ambiguity resolution needed to convert code phase differences into pseudorange differences is achieved by utilizing the approximate location for the receiver obtained from the Aiding Source 2. When the approximate location is then combined with approximate time from a real time clock (accurate to say 1 minute) and current almanac data (less than about 2 months old in the case of GPS which provides range errors of less than about 30 km), this permits approximate ranges of the satellites to be determined to better than half of a code epoch multiplied by the speed of light which is the ambiguity interval for the code phase differences. By combining the set of approximate ranges and the set of code phases, unambiguous and precise pseudorange differences are derived without the need to synchronize the receiver to better than about one minute.

Furthermore, consistent with the aiding data minimization objective, the SPS Receiver 1 is able to compute PV solutions without the need for being supplied with Doppler information. In traditional devices, such information is used to assist in restricting a carrier frequency search during signal acquisition or to predict changes in satellite range as an alternative to using the satellite ephemeris data. In the present invention, the SPS Receiver 1 estimates Doppler information using stored current almanac data.

Using this current almanac data, the SPS Receiver 1 estimates the Doppler frequencies of the satellites to an accuracy of better than about 250 Hz for GPS given approximate locations of the satellites known to better than about one hundred kilometers. This is sufficient accuracy to achieve a rapid acquisition provided that the frequency offset of the reference oscillator of the SPS Receiver 1 is known to within a few Hz. To achieve this latter requirement, the reference frequency offset is estimated each time a PV solution is computed and thus it can be tracked. Moreover, to the extent that the reference frequency varies with temperature as well as aging and to the extent that a large change in temperature between PV solutions will lead to a degradation in acquisition performance, the SPS Receiver 1, as described below, utilizes a method that copes with the change and ensures graceful degradation.

To ensure the presence of current almanac data without the use of an Aiding Source 1, the SPS Receiver 1 must be activated often enough and for long enough in the presence of strong signals to keep the data current. In the case of the GPS system, the almanac data must be less than 2 months old to remain current. To meet this goal under GPS, the SPS Receiver 1 must gather approximately 27 sets of orbital coefficients over a period of around 2 months. On average it would take around 20 s plus signal acquisition time to gather one set and it would take around 60 such gatherings to acquire all of the sets. Hence, if the SPS Receiver 1 was activated in the presence of strong signals approximately once per day on average for about 30 s then the stored almanac would remain current.

B. Weak Signal Acquisition/Tracking in Presence of Jamming Signals

One of the problems associated with the use of weak SPS signals is that any SPS system has a limited dynamic range. In the case of the C/A Code signal of the GPS system, for example, any signal that is weaker by more than about 20 dB than another signal that is also present may be jammed by the stronger signal. There are 2 main effects of this jamming. First, while attempting to acquire the weaker signal using a sufficiently low threshold, the receiver's search sequence will be interrupted by frequent false alarms because the cross-correlations between the strong signal and the code generated in the receiver will be often be above the threshold. Second, although the receiver may be able to acquire and track the weaker signal, it will be susceptible to large measurement errors caused by cross-correlation side lobes from the stronger signal dragging the tracking algorithm away from the true correlation main lobe.

It is highly desirable to avoid the first of these problems and it is essential to avoid the latter problem as it can result in gross positioning errors of up to several kilometers. Thus, the SPS Receiver 1 should attempt to acquire strong signals before attempting to acquire weaker signals. In this regard, FIG. 2 outlines an example procedure for a GPS receiver that ensures that any strong signals are acquired first using a high threshold. A threshold for acquisition of any remaining needed signals will then be set, in the case of GPS, 20 dB below the strongest signal acquired. While the FIG. 2 contains information pertinent to GPS system, its general application would be equally applicable to any other SPS system.

Figure 2:
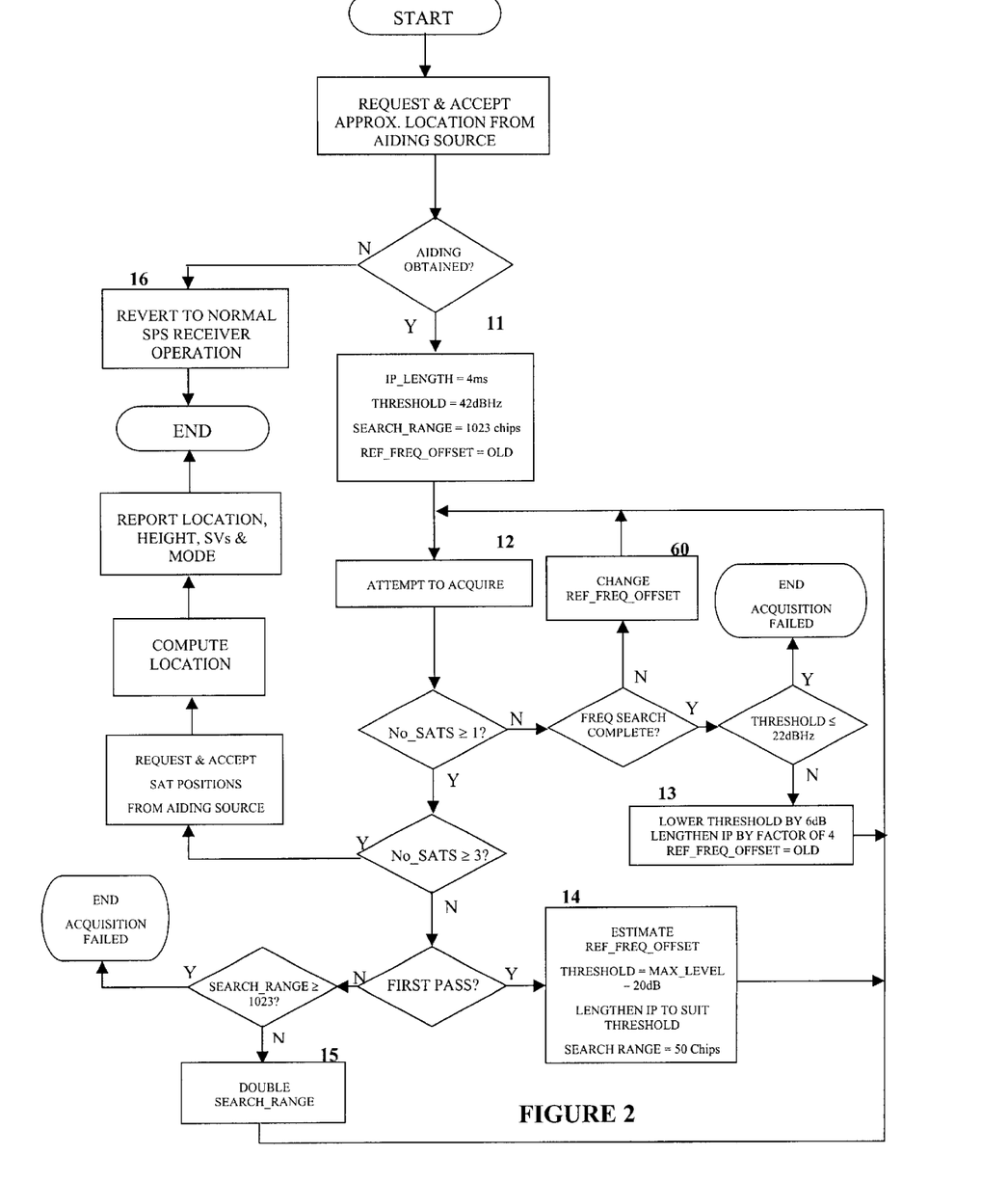
FIG. 2 is a flowchart describing the overall algorithm according to one embodiment of this invention for acquiring satellite signals, measuring code phases, carrier smoothing these measurements, computing pseudorange differences and computing handset location.

Referring to FIG. 2, the device starts with the first request/response exchange in attempt to acquire the SPS Receiver's 1 approximate location from the Aiding Source 2. If the exchange is successful and the approximate location aiding data is received, the device sets its initial search parameters in step 11 with the goal of acquiring the strong signals. The parameters for the search are initially set to a high threshold and with a short integration period adequate for acquisition at the selected threshold. There is no prior knowledge of the code phases of the satellites and therefore the search is unrestricted. The reference frequency offset is assumed to be a prior value that was measured when the receiver was previously active (i.e. "old"). In subsequent step 12, with these parameters, the SPS Receiver 1 uses a multi-channel device to perform a concurrent search for the strong signals of all visible satellites.

In the GPS example, conducting such an unrestricted code search with 1 channel per satellite at 1 chip per integration period using 2 arms per channel with 0.5 chip spacing would take 1023/4=256 integration periods or approximately 1 second. In most cases this would be adequate to acquire any strong signals present.

However, in some instances, the assumed frequency offset of the receiver's reference oscillator may have changed by a larger amount than can be accommodated for by the sampling rate of a correlator's output samples. Thus, if no satellite signals are acquired during an attempt using the assumed reference frequency offset, then the offset would be adjusted in step 60 and the search continued without lowering the threshold. In this way, the offset would be changed systematically to effect a search over the possible frequency range. The systematic search would terminate on the acquisition of one or more satellites at the highest possible threshold.

If no satellite signals were acquired over the possible frequency range then, in step 13, a lower threshold would be set (e.g. 6 dB lower) and a longer integration period would be used (e.g. 4 times as long). The reference frequency offset would be set back to the previously assumed value and the frequency search would be restarted using these parameter values.

In the original search to locate at least one satellite, if any strong signals are acquired and additional signals are still needed, then the measured carrier to noise ratio of the strongest signal acquired would be used to determine both the integration period to be used for a subsequent search in step 14 and the acquisition threshold to be applied during the search. For example, if a signal of greater than 50 dBHz was acquired then the integration period for the subsequent search need not be any more than 32 ms. This is because it is possible to detect signals of 30 dBHz or more with an integration period of 32 ms and the threshold would have to be set at 30 dBHz or higher to avoid the dynamic range problems previously described.

The reference frequency offset would also be estimated using the approximate location of the SPS Receiver 1 together with the almanac data and the measured carrier frequency of the acquired signal. This should obviate the need for further frequency searches.

Since at least one satellite has been acquired, a restricted search regime can be conducted for the remaining satellites using one channel per satellite since the approximate code phase differences between all of the remaining visible satellite signals and the first one can be estimated. If the accuracy of the approximate position estimate is assumed to be ±10 km then the code phase differences can be estimated to within ±25 $\mu$s, approximately. In the GPS case this would permit all of the remaining satellites to be acquired within 50*0.128 s or 6.4 s. However, the search could be terminated once sufficient satellites had been acquired to permit the location to be determined.

In the GPS example, assuming that the second search did not fail, the maximum time taken to acquire enough satellites would thus be 1 s for the first search for strong signals plus 4 s for the second search for the first satellite plus 6.4 s for the subsequent search for the remaining satellites. This adds up to 11.4 s. However, typically, acquisition would take less than this (e.g. 1 s+4 s+3.2 s or 8.2 s).

For the acquisition performance of this scheme to degrade gracefully, it is necessary to address the following cases of failure:

1. The second frequency search to acquire the first satellite signal could fail because all of the signals are even weaker than the adjusted threshold. One appropriate method for failure would be to conduct additional searches using sequentially lowered threshold values adjusted in step 13 until some final threshold is utilized.
2. The approximate receiver location could be less accurate than the assumed ±10 km and, as a result, insufficient satellite signals are acquired during the first pass of the weak signal search. One method to address this failure is to perform further frequency search passes with sequential increases in the search range performed in step 15. This scheme would degrade gracefully with an increase in acquisition time. However, it would ensure that any satellite signals that can be acquired would eventually be acquired. On average, the use of approximate receiver locations of greater inaccuracy will result in longer acquisition times.
3. The aiding message may not be received. This could mean that the selection of visible satellites is wrong because the receiver could be many thousands of km from the assumed location. This would also prevent any of the searches from being restricted as described. More importantly, it would prevent the pseudorange differences from being unambiguously determined from the code phases once measurements were made. It would also imply that the second aiding message will not be available when required and this would prevent a location solution from being computed. One response to this failure is to simply revert to standard SPS receiver operation as shown by step 16. Thus, in the GPS case, an integration period of 32 ms could be used and the last known location would be assumed with searches for a first satellite and subsequent satellites as described above and failure responses as described above. In this case the ability to acquire really weak signals would be lost but normal GPS performance would be achieved. In the open, acquisition within around 15 s would still be typically achieved although it would be necessary to acquire ephemeris before the location could be determined and this would introduce a further delay of up to 30 s.

One of the limitations of weak signal GPS operation is that a strong signal will jam any signal more than 20 dB weaker than it. Spurious cross-correlations exist between the GPS C/A codes at 20 dB below the peak autocorrelation value. In addition spurious self-correlations occur at 25 dB below the main correlation.

A side-effect of such a scheme is that one or more strong signals may prevent other much weaker signals from being acquired. This may occur in urban canyons, or close to windows inside buildings or at the sides of multi-storey carparks where there are often too few strong signals to permit a location to be estimated.

An alternative approach involves the design of special hardware features into the correlator to permit strong signals to be selectively and partly cancelled in the composite signal as (or before) it enters the correlator. This then reduces the dynamic range with which the rest of the correlator must cope thereby allowing more satellite signals to be acquired.

Figure 7:
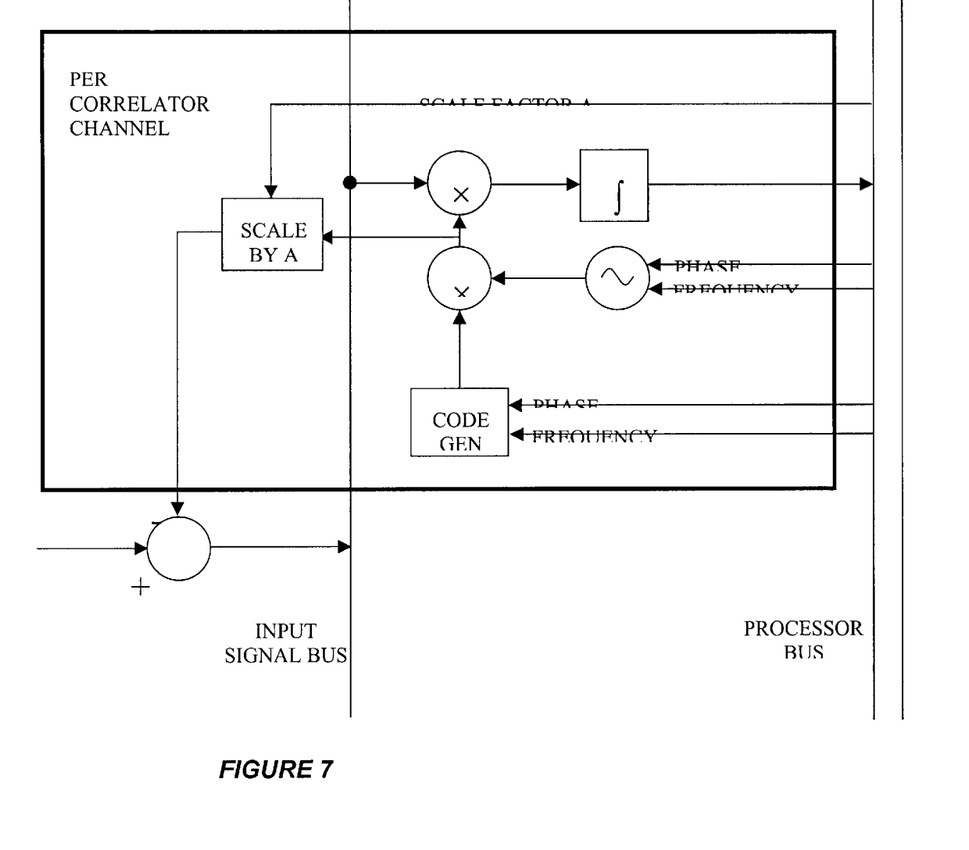
FIG. 7 depicts a hardware arrangement of the correlator.

FIG. 7 illustrates the hardware arrangement required. Each hardware channel incorporates a final downconversion local oscillator generating a complex sinusoid and a code generator generating a real binary Gold code sequence. These locally generated signals are multiplied together for correlation with the input signal and the frequency and phase of each is controlled by the processor. So far, this is a similar arrangement to that in a normal GPS correlator except that, normally, the locally generated code sequence and the final downconversion signal would be separately multiplied with the input signal.

The major difference, however, is that the locally generated signal can be scaled and subtracted from the input signal before it is presented to the input signal bus that is used to reticulate the input signal to all of the correlator channels. The processor controls the scaling used.

Using this hardware, the processor firmware can acquire and track a strong signal. Under these conditions, the locally generated signal is a scaled replica of the signal from one satellite that is present in the input signal. Hence, the firmware can then set the scaling factor (A in FIG. 7) such that the strong signal from that one satellite is partly cancelled by the locally generated replica. By monitoring the residual signal level, the firmware can adjust the degree of cancellation to effect a compromise between the need to mitigate against spurious correlations and the desire to retain good noise performance in the tracking of the strong signals.

The main difficulty with this scheme is that the representation of both the input signal and the locally generated signals within the correlator is usually very coarse. The input signal, for example may often be represented using 2 bits. This may not allow the scaling to be performed numerically with sufficient precision to effect an adequately controlled partial cancellation. The solution to this may be for the scaling and cancellation to be performed within the analogue circuitry ahead of the digitisation of the input signal. Alternatively, the signals may be represented with greater numerical resolution and/or the scaling may be performed by performing an exact (or nearly exact) cancellation for part of each integration period.

A receiver can be designed to utilize both weak and strong signals. When strong signals are present, such a receiver operates normally to extract almanac and ephemeris data and measure pseudoranges or pseudorange differences. However, when they are not present the receiver operates in weak signal mode. If the receiver has already extracted ephemeris data for the satellites to be used in weak signal mode and has already determined its approximate position then no aiding is required. If not then the receiver can use aiding data from any convenient aiding source.

The receiver can switch modes dependent on the number of strong signals available. If not enough strong signals are available to permit a sufficiently accurate location to be estimated then the receiver would switch into weak signal mode. In this case, strong signals can still be used but the signal processing, measurement construction and satellite position computation would all be performed in weak signal mode.

Furthermore, a receiver can be designed such that individual channels may be in weak signal mode and others in normal mode. In this case, the signal processing regime for each channel would be selected on the basis of the signal strength of the corresponding satellite as would the mode of measurement construction. The satellite positions would be computed from the ephemeris data for those satellites for which ephemeris data was available and using almanac corrections for all other satellites to be used in the location solution. For those signals that were too weak to permit the pseudorange differences to be constructed normally, they would be constructed using ambiguity resolution techniques.

Figure 3:
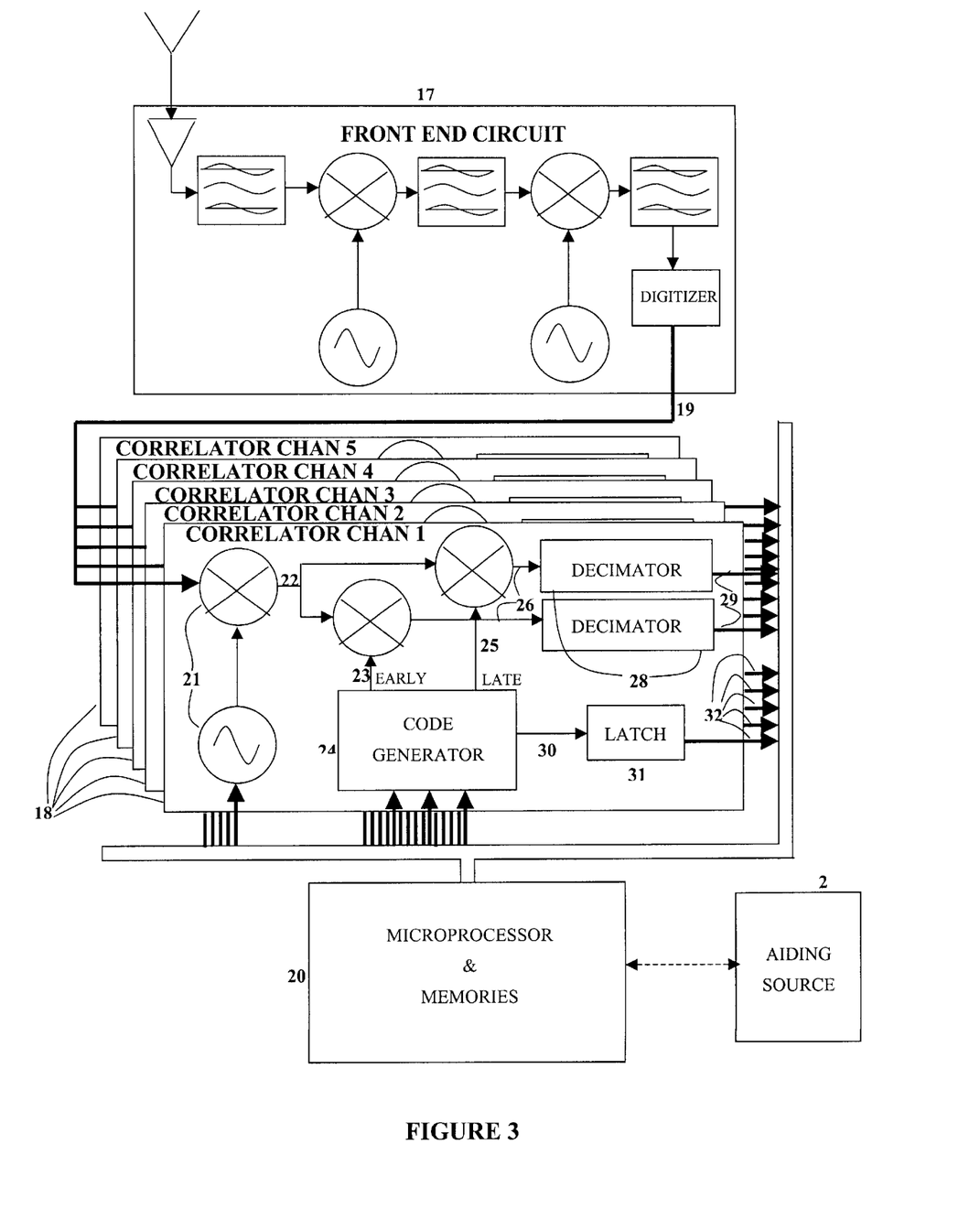
FIG. 3 is a block diagram of a typical SPS receiver according to this invention.

If aiding broadcasts were not being used then receivers of either of these mixed mode types would only request aiding data when it was needed. For telematics and automatic vehicle location systems, aiding data would only be needed if the receiver was in very cluttered environments for long periods. In such applications, the use of weak signal technology may avoid the need to use dead reckoning sensors such as gyrometers, accelerometers and odometer pulse counting circuits as are sometimes used to provide accurate location tracking in severe urban environments. In other cases, the availability of location information would be increased significantly over that provided by unaided conventional GPS receivers C. Simultaneous Code Phase Determination of Multiple Satellite Signals To achieve the aiding scheme as described, an SPS Receiver 1 of the present invention requires the ability to determine the code phases for multiple satellite signals at the same instant. In this regard, FIG. 3 depicts one such SPS Receiver 1. Generally, the SPS Receiver 1 can be broken down into roughly three parts. The device has a front-end circuit 17, three or more correlators 18 and a microprocessor 20 with memory. The following describes the functions of each.

Generally, the front-end circuit 17 serves as the initial signal processor as follows. The front-end circuit 17 amplifies, filters, down converts and digitizes the signal from an antenna so that it is suitable for processing in a digital correlator 18 and such that the signal to noise and signal to interference ratios are minimized subject to economic and practical realization requirements. The front-end output 19 of the front-end circuit could be a complex signal centered at tens of KHz (in the case of GPS) or a real signal centered at around 1.3 MHz or higher. The sampling rate would typically be several MHz and the digitization would be at least 2 bits per sample. In the preferred embodiment an AGC circuit keeps the level of the digitized signal constant. Since the true signals are spread over 2 MHz in the case of GPS and are weak signals in any case, this signal is dominated by noise and the AGC maintains a constant noise level at the output of the front-end.

Hardware correlators 18 each representing a processing channel for a particular satellite signal are used separately to further process the front end output 19 under the control of the microprocessor 20. Within each correlator 18 a further down conversion 21 (quadrature in this case) to nearly DC is performed based on the estimated Doppler offset of a particular satellite signal and the estimated offset of the crystal oscillator reference frequency driving the correlator. Then, the resulting complex down converted signal 22 is mixed with (i.e. multiplied by) a real binary pseudorandom code signal 23 chosen to match that of a particular satellite signal and generated by a code generator 24. The code generator 24, controlled by the microprocessor 20, generates the pseudorandom code signal 23 at a selected rate set to match the estimated signal Doppler offset given the estimated crystal oscillator offset.

The code generator 24 also generates a late pseudorandom code signal 25 that is the same as pseudorandom code signal 23 but at a fixed lag with respect to the former. This late pseudorandom code signal 25 is also mixed with the down converted signal 22. The resulting mixed signals 26 are then separately processed by decimators 28. Decimators 28 low pass anti-alias filter and down sample the mixed signals 26 to a reduced sampling rate. In the case of GPS, the reduced sampling rate is approximately 1 KHz. This sampling rate may be derived from the local code rate such that a single sample will be obtained for each code epoch. However, this is not essential.

When searching in code, the processor 20 either causes the code generator 24 to step instantaneously by the required amount at the start of each integration period or changes the code frequency by a known amount for a precise period of time so as to effect a rapid step in the code lag. This is the preferred embodiment although in an alternative scheme the code frequency may be deliberately offset while searching so that the code slews continuously relative to that of the incoming signal.

When tracking a satellite signal, in this embodiment, the processor 20 constantly adjusts the code lag as just described so as to keep the pseudorandom code signal 23 and late pseudorandom code signal 25 from the code generator 24 running one ahead (early) and one behind (late) the code of the incoming signal. In other embodiments, the code generator 24 may generate a third signal (prompt) that is kept running synchronously with the code of the incoming signal or, indeed, there may be several more signals spanning a lag interval of up to 1 chip (smallest code elements) early and late of the incoming code.

The correlator output samples 29 are read into the processor 20 where they are further processed by a signal processing algorithm described later in this specification to estimate the amplitude, frequency and phase of the carrier signal. Then, if data is to be extracted because the signal is strong enough for that, the phase and frequency are utilized by a separate algorithm that operates on the raw samples to extract the data. Methods for the extraction of this data will be obvious to one skilled in the art.

The frequency of the tracked carrier signals are then used to estimate the Doppler offset of the carriers and the crystal oscillator offset. The former Doppler offset values are subsequently used to estimate the velocity of the receiver (and the vehicle in which it may be travelling).

The amplitude of the early and late correlator output samples 29 represent estimates of the carrier to noise ratio of the satellite signal since the noise level is maintained constant by the AGC of the front-end. When performing a satellite signal search, the amplitudes are compared to a threshold to determine if the signal has been detected. If it has, then an acquisition procedure is commenced. The steps of an appropriate acquisition procedure will be obvious to one skilled in the art.

When tracking, the code phase is adjusted as discussed earlier in order to keep the average amplitudes of the correlator output samples 29 equal to each other. A similar, but more complex algorithm can be applied if 3 or more correlator output samples 29 are present. The nature of these control algorithms will be obvious to one skilled in the art.

At the end of each integration period the code phase 30 for each correlator 18 are simultaneously latched by a latch element 31 within the hardware correlator. The resulting signal represents the code phase measurement 32. These code phase measurements 32 are then made available to the processor 20. The processor 20 then applies a smoothing algorithm to the code phase measurements 32 together with the carrier frequency estimates. This algorithm is used to reduce the random error in the code phase measurements 32 over time by making use of the precision in the carrier frequency estimates to predict the changes in code phase from one integration period to the next. The algorithm also filters the carrier frequency estimates to reduce their random errors. The carrier smoothing algorithm is described later in this document.

After several seconds of smoothing, (five seconds in the preferred embodiment), the carrier smoothed code phase measurements and the filtered carrier frequency estimates are passed to the location solver which estimates the SPS Receiver's 1 location and velocity. The algorithm makes use of precise satellite position data and the approximate location received from the aiding source. This calculation is described in more detail later in this document. The signal processing, carrier smoothing and location solving algorithms are all executed by the processor 20.

D. Satellite Signal Processing Algorithms

As previously noted, special processing of the weak satellite signal is required in order to determine its code phase differences for purposes of calculating a PV solution from them. To this end, the invention utilizes an algorithm to measure amplitude, frequency and phase of the satellite signal. The invention also applies a smoothing procedure to the code phase measurements and the carrier frequency estimates to reduce random errors occurring over time. Finally, a formula is applied to convert the code phase differences into a precise position and velocity solution. Each algorithm is addressed in turn.

(1) Estimating Amplitude, Frequency and Phase of Weak Satellite Signal

Any SPS Receiver 1 employing a hardware correlator 18 with several signals in each channel is required to estimate the amplitude of the carrier in each of those several signals in the presence of the data. In a conventional receiver a phase locked loop or a frequency locked loop and a delay locked loop control the frequency of the final down converter 21 and the code generator 24 respectively. In the weak signal case however, the signals are too weak to permit lock-in without the use of some sort of aiding from an auxiliary algorithm. The signal processing algorithms of the present invention could be used as auxiliary algorithms for acquisition or they may be used independently of any phase-locked or frequency-locked loop for both acquisition and tracking.

With strong signals it is possible to detect a signal from individual correlator output samples 29 with sufficient reliability to permit lock-in. In the weak signal case, the correlator output samples 29 are so noisy that the signal is indistinguishable from the noise unless the correlator output sampling rate is extremely low (e.g. 8 Hz for GPS). However, to avoid the Decimators 28 filtering out the residual carrier at such a low sampling rate, the Doppler frequency and the crystal oscillator offset would have to be known to an impractical high precision. Accordingly, a higher correlator output sampling rate needs to be retained and a suitable algorithm is required to estimate the amplitude of the residual carrier signals in the code phase measurements 32.

Figure 4:
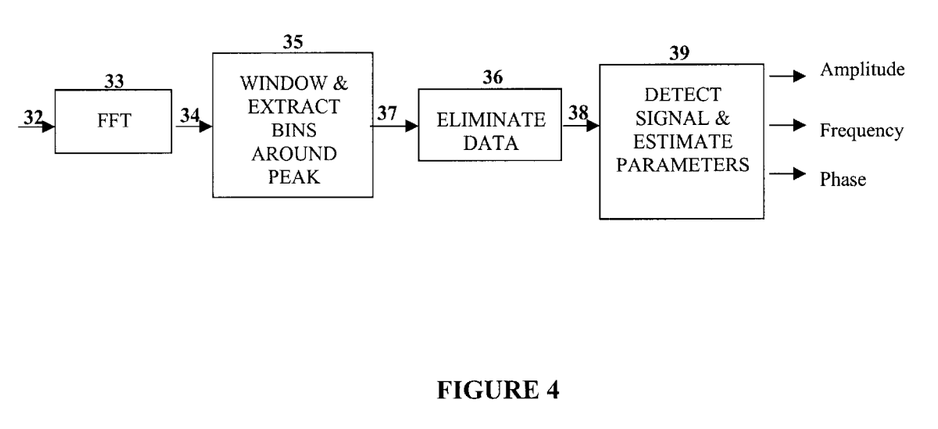
FIG. 4 is a block diagram describing the signal processing algorithm used to measure amplitude in each of an early and a late arm of each channel of the correlator according to one embodiment of this invention.

FIG. 4 depicts a flow chart for an algorithm used to measure amplitude, frequency and phase of the signal from each of the early and late mixed signals 29 of the correlator 18 according to one embodiment of this invention. Referring to FIG. 4, the procedure involves the use of a Fast Fourier Transform 33 applied to a block of samples from the code phase measurements 32 of the correlator 18. The effect of this algorithm is to compress the residual carrier signal into a few bins of the FFT output 34. Thus, whereas the satellite signal is undetectable when its energy is spread across all of the time domain samples contained in the code phase measurements 32, it is detectable in the bins of the FFT output 34. However, its amplitude is not readily estimated because the data modulation splits the satellite signal between several adjacent bins in a semi-random manner depending on where the transition falls in relation to both the integration period and the phase of the residual carrier at that instant.

Nevertheless, having detected the probable presence of a satellite signal it is possible to reject much of the noise by applying a window operation 35 on the bins of the FFT output 34 centered on the peak value. More distant bins may be discarded completely. This is simply a filtering operation and significantly improves the signal-to-noise ratio prior to non-linear processing 36 of the window-filtered signal 37 to eliminate the data transitions. The remaining windowed bins in the window-filtered signal 37 may be processed in one of several ways in order to estimate the amplitude in the presence of the noise and data as follows:

1. The discarded bins may be zero filled and the complete set of bins can then be inverse transformed back to the time domain. This would result in a set of time domain samples with significantly improved signal to noise ratio which may then be processed such as to effect lock-in of a phase locked loop or delay locked loop.
2. An inverse transform may be effected as described above and the time domain samples may be squared to remove the data. The amplitude of the resulting signal could then be estimated by transforming back into the frequency domain using a DFT to obtain a few bins centered on the previous FFT peak and applying any estimation algorithm suitable for estimating the amplitude and frequency of a cissoid embedded in noise based on the values of several FFT bins. It is important to note that one effect of squaring the signal will be to double the frequency of the residual carrier signal such that it may be aliased by the samples. This ambiguity will need to be resolved when determining the frequency.
3. The vector of remaining windowed bins may be autoconvolved to remove the data in an autoconvolution process 36. This is equivalent to squaring in the time domain but, if the number of bins in window filtered signal 37 is small compared to the size of the FFT 33, then the autoconvolution process 36 may be less computationally costly than the process described in option 2 above. The autoconvolved samples 38 can then be processed by any estimation algorithm 39 suitable for estimating the amplitude and frequency of a cissoid embedded in noise based on the values of several FFT bins. Again it is important to realize that the frequency corresponding to each bin has been doubled by the autoconvolution process 36 and the bin width has thus been effectively halved for the purposes of frequency estimation.

The preferred embodiment of the invention employs option 3 for estimation of the amplitude and residual carrier frequency. The RF carrier frequency is estimated as follows:

$$Fc = Fd1 + Fd2 + (Np1 + (Np2 - Nnom + N\Delta)/2) * Fbin - \Delta Fxo * Fnom / Fxo$$

Where:
Fc is the RF carrier frequency;
Fd1 is the total frequency shift due to the front-end down conversion;
Fd2 is the frequency shift due to the down conversion in the correlator;
Np1 is the bin number (between $-N/2$ and $(N/2+1)$) for an N-point FFT) of the peak in the FFT (which is the center bin of those extracted for performing the autoconvolution);
Np2 is the bin number of the peak bin in the autoconvolved bins computed (which is the center bin of those extracted for estimating the amplitude and frequency);
Nnom is the bin number of the nominal peak bin in the autoconvolved bins computed (i.e. corresponding to zero lag);
N$\Delta$ is the frequency adjustment (in bins and fractions of bins relative to Np2) estimated by analysis of several adjacent bins of the autoconvolved bins computed;
Fbin is the bin width of the original FFT;
$\Delta$Fxo is the crystal oscillator offset from its nominal frequency;
Fnom is the nominal RF carrier frequency of the signal; and
Fxo is the nominal crystal oscillator frequency.

While the signal is being tracked it is possible to reduce the computational load of the signal processing, if this is desirable, by utilizing the precise value of the residual carrier frequency as estimated in the previous integration period. For example, only those bins used in the previous integration period need be computed.

(2) Signal Smoothing

Figure 5:
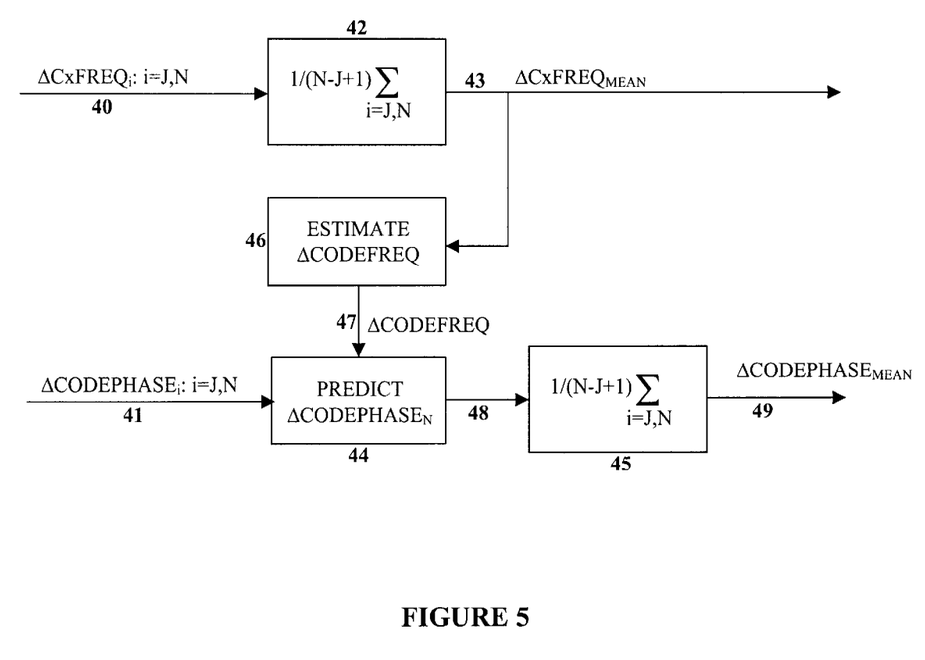
FIG. 5 is a block diagram describing the carrier smoothing algorithm used to reduce the error in the code phase measurements according to one embodiment of this invention.

While the signal is tracked the code phase and frequency estimates may be refined by a carrier smoothing process prior to being passed to the location solver. FIG. 5 depicts the flow of such a process. The algorithm illustrated is a block computation applied to the stored estimates from several integration periods (arbitrarily labeled from J to N) to compute a single set of measurements representing refined measurements for the final integration period.

In the preferred embodiment, the algorithm processes differences between the estimates from one satellite and those from all the others rather than processing the absolute estimates for individual satellites. The reason for this is that in the preferred embodiment of the location solver, differences rather than absolute estimates are used because differences can be processed without the need to take account of the frequency offset of the reference oscillator.

All of the frequency difference estimates 40 corresponding to a particular satellite signal are simply averaged in step 42. The average carrier frequency difference 43 is then used to predict forward in prediction step 44. This prediction step 44 is used for all but the latest code phase differences 41 for that satellite to the latest measurement instant before averaging them in step 45. The prediction step 44 uses an estimated Doppler offset of the code 47 determined from step 46 which is based upon the difference between the Doppler offsets of the carrier frequency (Fc1−Fc2). With the estimated Doppler offset of the code 47, step 44 is used to predict forward the code phase differences 41 by N integration periods using the following formula:

$$\Delta p1 - \Delta p2 = Frac(\Delta m1 - \Delta m2 + N*Tip/(Te*Fnom/(Fc1-Fc2)))$$

where:
$\Delta p1 - \Delta p2$ is the predicted code phase difference 48 expressed as a fraction of a code epoch;
the Frac function yields the fractional component of the real argument;
$\Delta m1 - \Delta m2$ is the measured code phase (41) to be predicted forward;
Tip is the nominal integration period;

Te is the code epoch period as determined from the tracking algorithm; and

All other quantities are as previously defined.

The predicted code phase differences are then averaged in step 45 to produce an average code phase difference 49.

(3) Position and Velocity Solution Computation using Code Phase Differences

Figure 6:
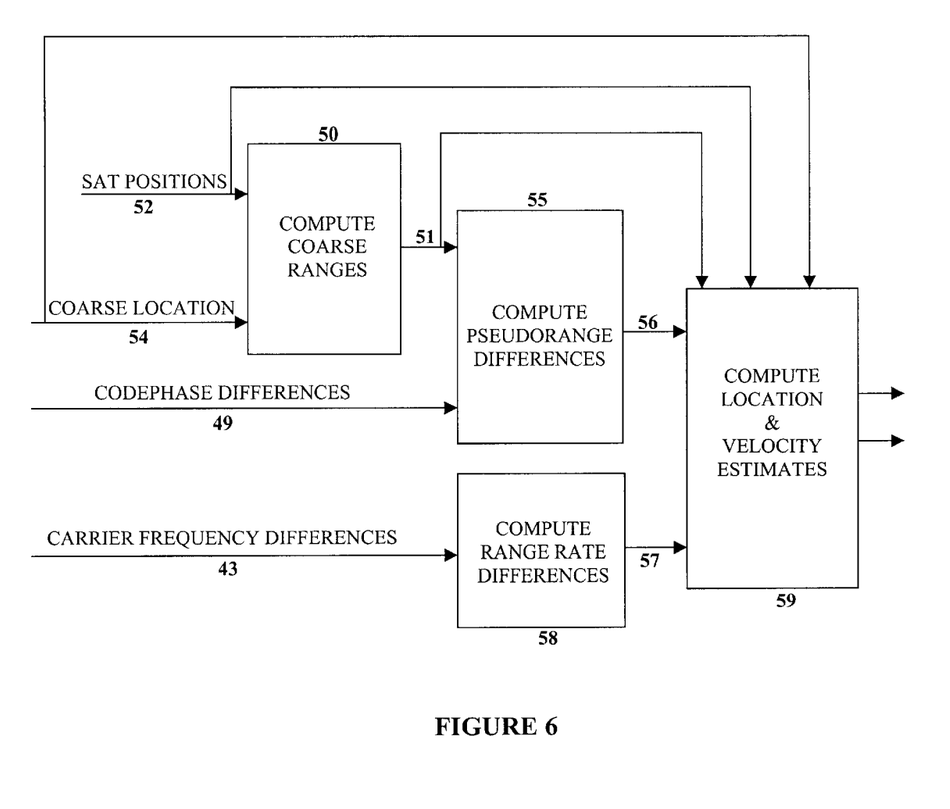
FIG. 6 is a block diagram describing the algorithm used to compute the location and velocity from the code phase and carrier frequency differences according to one embodiment of this invention.

As previously discussed, a PV solution is computed by the SPS Receiver 1 after code phase differences have been processed by the aforementioned smoothing algorithm. FIG. 6 illustrates the PV solution process used by a preferred location solver. The location solver, which computes the location and velocity using the refined average carrier frequency differences 43, the average code phase differences 49, the precise satellite positions 52 and the approximate receiver location 54 as follows.

In step 50, approximate ranges 51 to all of the satellites for which there are measurements are computed. Since the satellite positions 52 are supplied by the Aiding Source 2, this step simply involves the vector difference of the Cartesian coordinates of the satellite positions and the approximate location 54, which was also supplied by the Aiding Source 2. The vector magnitudes of these vector differences are approximate ranges 51.

In step 55, the epoch ambiguities are resolved and the average code phase differences 49 are converted into pseudorange differences 56. All of the approximate ranges 51 are subtracted from the approximate range of a reference satellite (as selected for computing the code phase differences) to give approximate range differences. These are saved for later use as well as being used in resolving the epoch ambiguities according to the following formula:

$$P1-P2=int[(R1-R2)/c*Te-(\Theta 1-\Theta 2)+0.5]+(\Theta 1-\Theta 2)$$

Where:

C is the speed of light;

Te is the nominal epoch period;

P1 and P2 are the pseudoranges 56 of satellites 1 and 2;

R1 and R2 are the approximate range estimates for the same two satellites;

$\Theta 1-\Theta 2$ is the code phase difference between the same two satellites.

In step 58, the range rate differences 57 are calculated from the Doppler affected average carrier frequency differences 43. The range rate differences 57 are computed according to the formula:

$$d(R1-R2)/dt=-c*(Fc1-Fc2)/Fnom$$

where:

c is the speed of light and d(R1-R2)/dt is range rate difference 57 between satellite 1 and satellite 2.

In one alternative embodiment of the invention, the current location estimate 60 and current velocity estimate 61 are computed in step 59 by a method similar to that for a single update of a Kalman navigation filter in a traditional SPS receiver. In fact, if time allows, a true navigation filter can be run for several updates to further refine the estimated PV solution. (However, in this case the satellite positions will need to be updated from the Aiding Source 2.) The Kalman gain matrix, K, is given by the well-known equation:

$$K=PM^T(MPM^T+R)^{-1}$$

and $$X=X_{INIT}+K(Y-Y_{PRED})$$

where Y is the measurement vector and X is the solution state vector containing the location and velocity estimates. Using this equation, the initial state vector, $X_{INIT}$, is set to the approximate location from the aiding source with zero velocity. The first prediction vector, $Y_{PRED}$, is set to the approximate range differences derived from the approximate ranges 51 and zero for the range rate differences 57.

The state covariance matrix, P, is initialized to a diagonal matrix with the entries representing the estimated variances of the approximate location and velocity estimates. The location variance estimates may be obtained from the Aiding Source 2 or a fixed value could be used. The initial velocity estimate is zero and its variance depends on the application. The measurement variances can be estimated as in a conventional receiver except that the measurement variance matrix, R, is no longer diagonal. The fact that differences with a reference satellite were computed means that the covariance terms between the satellites are half of the value of the variance estimates rather than zero as in a conventional receiver. The approximate location (54) and the satellite positions (52) can be used to determine the direction cosines and the direction cosine differences form the rows of the measurement matrix, M.

An additional signal processing step has been found to be beneficial in further improving the attainable sensitivity of the system. This involves non-coherent integration by filtering the magnitudes of the autoconvolved bins across the coherent integration periods using a weighted averaging filter prior to picking the peak. An example of this type of filter would be:

$$X_{i,j}=AX_{i,j-1}+(1-A)Y_{i,j}$$

Where $X_{i,j}$ is the magnitude of the ith bin of the non-coherently filtered autoconvolved bins at integration period j, $Y_{i,j}$ is the ith bin of the autoconvolved bins at integration period j and A is a constant filtering coefficient. The larger the value of A, the greater the degree of filtering.

Non-coherent filtering has been found to improve the robustness of the tracking of weak signals, thereby lowering the signal level at which signals can be successfully captured and tracked. The filtered magnitude is used in lieu of the cisoid amplitude estimate

We claim:

1. An SPS system for identifying the location of a receiver in the presence of satellite signal attenuation comprising:

a plurality of orbital satellites sending synchronized encoded signals on a carrier frequency wherein said encoded signals have repeated epochs containing synchronization data;

a receiver for detecting, acquiring, tracking a set of the encoded signals and simultaneously determining the code phases of said set with respect to said epochs; and an aiding source to transmit an approximate location of the receiver and the position and velocity of a plurality of satellites;

wherein the receiver determines a precise location using the approximate location, the satellite positions, the code phases and carrier frequency differences.

2. The system of claim 1 wherein the precise location is determined using the offsets between the code phase of one or more reference signals and the code phase from corresponding encoded signals.

3. The system of claim 1 wherein the receiver transmits a request to the aiding source and in response the aiding source transmits an approximate location for the receiver.

4. The system of claim 1 wherein the receiver detects and acquires the set of encoded signals using a search method in which the receiver first detects and acquires stronger encoded signals, if and when available, and then detects and acquires weaker encoded signals.

5. The system of claim 1 wherein the receiver conducts concurrent searches for multiple satellites signals.

6. The system of claim 1 wherein the receiver restricts its search by estimating code phase differences for additional satellites after acquiring at least one satellite.

7. The system of claim 6 wherein the receiver broadens its restricted search if any additional satellites are not detected and acquired.

8. The system of claim 1 wherein the receiver, after acquisition of a plurality of satellites, transmits a request that includes the identities of a plurality of satellites and in response, the aiding source transmits each satellite's location and velocity.

9. The system of claim 1 wherein the aiding source determines and transmits the position and velocity of a plurality of satellites in response to a request from the receiver.

10. The system of claim 9 wherein the aiding source determines location and velocity of the plurality of satellites using ephemerides data received from the satellites, the time of receipt of the receiver's request and the transmission latency of the request.

11. The system of claim 1 wherein the receiver transmits to the aiding source receiver information selected from a group of receiver information including:
  location;
  speed;
  heading;
  height;
  solution mode;
  satellite identities used in a recent location solution; and
  code phase differences.

12. The system of claim 1 further comprising a call taker for using or processing receiver location information.

13. The system of claim 12 wherein the aiding source further transmits the approximate location of the receiver to the call taker.

14. The system of claim 12 wherein the aiding source further transmits the precise location of the receiver to the call taker.

15. The system of claim 1 wherein the aiding source transmits satellite clock corrections to the receiver.

16. The system of claim 1 wherein the receiver performs a smoothing operation on the code phases of the encoded signals experiencing signal attenuation.

17. A method for determining a precise location of a receiver in the presence of attenuated satellite signals carrying synchronization data comprising:
  receiving and storing almanac data for regional satellites in a receiver;
  requesting from an aiding source an approximate location of the receiver;
  sending an approximate location of the receiver from the aiding source in response to a request from the receiver;
  detecting, acquiring and tracking a set of signals from a plurality of satellites by the receiver;
  determining simultaneously in the receiver the code phases from the set of signals and then determining an offset for each code phase with respect to a corresponding reference code phase;
  sending a request including the identities of the plurality of satellites from the receiver to the aiding source;
  returning from the aiding source to the receiver the positions and velocities of each requested satellite; and
  determining in the receiver a position solution using the approximate location, almanac data, code phase differences and satellite positions.

18. The method of claim 17 further comprising sending receiver data to the aiding source.

19. The method of claim 18 wherein said receiver data is data from a group of data including:
  receiver location;
  receiver speed;
  receiver heading;
  receiver height;
  receiver solution mode;
  satellite identities used by the receiver in determination of a location solution; and
  receiver determined code phase differences.

20. The method of claim 17 further comprising sending receiver data from the aiding source to a call taker.

21. The method of claim 20 wherein said receiver data is data from a group of data including:
  receiver location;
  receiver speed;
  receiver heading;
  receiver height;
  receiver solution mode;
  satellite identities used by receiver in determination of a location solution; and
  receiver determined code phase differences.

22. The method of claim 17 wherein said detecting, acquiring and tracking step includes a frequency and amplitude signal search in which a search amplitude threshold value starts at a some level and is successively reduced to allow stronger signals to be acquired before more attenuated signals.

23. The method of claim 22 wherein a frequency range sweep is performed prior to each successive reduction of the search amplitude threshold value.

24. The method of claim 17 wherein the step of determining a position solution includes a determination of pseudoranges to each satellite using said code phase differences.

25. The method of claim 24 wherein said determination of pseudoranges is made using calculated approximate ranges to each tracked satellite.

26. The method of claim 25 wherein said approximate ranges are calculated using the approximate location and the satellite positions.

27. A device for use in an SPS system for determining a precise location in the presence of attenuated satellite signals comprising:
  a transmission means for sending requests for its approximate location and satellite positions and velocities to an external aiding source;
  a reception means for receiving the approximate location and satellite positions and velocities from the external aiding source;
  an antenna to receive transmitted satellite signals;
  a circuit to filter and sample the signals received at the antenna;
  a plurality of signal correlators;
  a control circuit, including a processor and memory, that effects signal detection in which stronger encoded signals are acquired before more attenuated signals by successively increasing a correlator output signal integration period and successively reducing an amplitude threshold value, wherein said control circuit determines the code phase offsets for a plurality of detected, acquired and tracked satellite signals in the plurality of signal correllators and using said code phase offsets in a determination of a location solution for the device.

28. The device of claim 27 wherein the control circuit adjusts a signal correlator based upon the received approximate location and stored almanac data.

29. The device of claim 27 wherein the control circuit effects a frequency range sweep prior to each successive reduction of the search amplitude threshold value.

30. The device of claim 29 in which the control circuit computes estimated Doppler offsets of the carrier and code frequencies of the satellite signals using stored almanac data, the approximate time and the approximate location to restrict the frequency range.

31. The device of claim 27 wherein the control circuit computes pseudoranges to each acquired satellite using said code phase offsets and calculated approximate ranges derived from the received approximate location and satellite positions.

32. The system of claim 1 wherein the aid source transmits to the receiver corrections from among the group of satellite positions, velocities, accelerations and position derivatives.

* * * * *